Patented Oct. 8, 1935

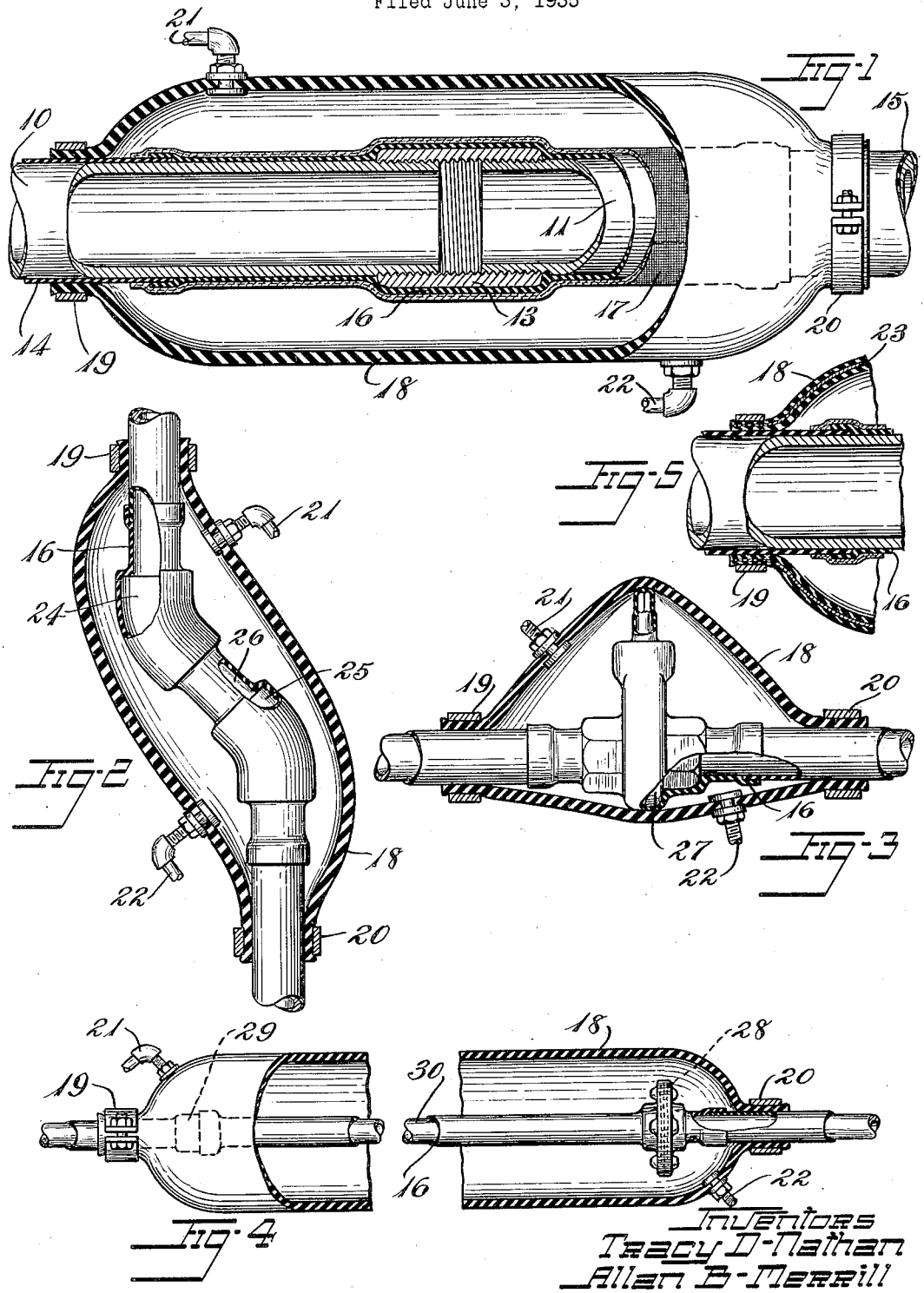

2,016,905

UNITED STATES PATENT OFFICE 2,016,905

METHOD OF APPLYING INSULATION TO A FLUID CONDUIT AND APPARATUS THEREFOR

Tracy D. Nathan and Allan B. Merrill, Akron, Ohio, assignors to The B. F. Goodrich Company, New York, N. Y., a corporation of New York Application June 3, 1935, Serial No. 24,680

8 Claims. (Cl. 18—5)

This invention relates to methods of applying insulation to a fluid conduit and to apparatus thereof, and is especially useful in the application of vulcanized rubber insulation to pipe lines when new lines are to be installed or repairs are to be made in existing lines.

Where metallic conduits pass through soil having acid or alkaline properties, the action of these chemicals upon the conduit, due to electrolytic or corrosive action, is severe.

Attempts to insulate such conduits against corrosion have been only partially successful due to the fact that where insulation with bituminous compositions was attempted, such compositions could not be used on conduits for hot fluids, or on conduits where oils and gases, in which the asphalt compounds were soluble, were to be conveyed. Asphalt compositions do not offer any great resistance either to heat or abrasion and are readily displaced from the conduit. Where paper and fabrics have been incorporated in the insulation, these have rapidly deteriorated under the influence of moisture.

The principal objects of this invention are to provide a method of forming a vulcanized rubber insulation on such a conduit, to provide apparatus for vulcanizing such insulation in situ, and to provide a method of progressively applying and vulcanizing such an insulation.

Other objects will appear from the following description and the accompanying drawing.

Of the drawing:

Fig. 1 is a view illustrating the preferred form of procedure and showing the apparatus, in its preferred form, as used in applying a section of insulation to a coupled joint in a metallic conduit, parts being broken away, and parts shown in section to facilitate illustration.

Fig. 2 is a similar view showing a modification of the procedure, and illustrating the application of the apparatus to a devious section of a conduit.

Fig. 3 illustrates the apparatus in use when a section of conduit including a valve is to be insulated, parts being broken away, and parts being shown in section.

Fig. 4 illustrates the apparatus in use where a section of conduit including a flange coupling and a nearby union is to be insulated.

Fig. 5 shows a modified form of apparatus, parts being broken away and parts in section.

In its simplest form the invention comprises covering a section of the pipe with an unvulcanized rubber composition, enclosing the covered section of the pipe with a sleeve, and vulcanizing the covering material by circulation of a heating fluid between the covering and the sleeve. The invention also contemplates the progressive covering of a conduit by steps similarly performed, and the covering of an insulated section of conduit between sections previously insulated. The invention also comprises the covering of various coupling and fluid controlling units forming a part of the conduit, and the novel sleeve apparatus used in carrying out the procedure.

Referring to the drawing, Fig. 1 shows two sections of metal pipe 10 and 11 connected by a screw coupling 13. The pipe 10 is provided with a hard rubber insulating coating 14 and the pipe 11 with a similar coating 15. These coatings may have been previously applied and terminate at a distance from the threaded portions of the pipe to permit the use of wrenches or pipe tongs in assembling the pipes.

In order to insulate the joint between the pipe sections, a layer of unvulcanized hard rubber composition 16 is applied over the bare section of the conduit. This material is applied by cleaning the metal by any convenient means, such as brushing and sanding away all scale or corrosion and washing the surface with gasoline or other organic solvent to remove all oil and grease, and applying a coat of rubber cement. The rubber sheet material is then carefully rolled into place so as to exclude air pockets. The rubber is preferably lapped at the joints and over the ends of the insulation 14 and 15.

A rag wrapping 17 is then applied over the unvulcanized rubber, under tension, to hold the rubber in place. A tubular sleeve 18, longer than the applied coating, is then slipped over the newly covered portion and is clamped to the conduit by clamp rings 19 and 20 applied over its ends. The sleeve is preferably made entirely of vulcanized elastic and pliable rubber.

In order to vulcanize the newly covered portion of the conduit and unite it permanently to the pipe and the covering previously applied, the sleeve 18 is provided with inlet and outlet fittings 21 and 22, clamped in apertures therein, through which liquids may be introduced or discharged. Steam, hot water, or other heating medium under pressure is then circulated through the sleeve in contact with the newly applied insulation, thereby vulcanizing the insulation in situ. After vulcanization, the clamps 19, 20 are removed and the sleeve 18 is advanced along the conduit. The rag wrapping is then removed.

The rag wrapping may be dispensed with, when desired, as shown in Figs. 2, 3, and 4, and vulcanization accomplished by direct contact of the steam or hot water with the hard rubber composition, but the rag wrapping is useful in temporarily protecting the unvulcanized coating and in facilitating the removal of air between the rubber coating and the metal.

The sleeve 18, while preferably of all rubber construction, may be made partly of metal, or it may have one or more layers of fabric or cord reinforcements in its walls. In Fig. 5 the sleeve is shown as having a layer of fabric 23 to give it additional strength to withstand inflation.

Where a new pipe line is to be installed, the several sections of pipe are preferably covered with rubber insulation extending short of the ends thereof before the pipe is delivered to the field, as the long sections of pipe may be more advantageously covered at the place of manufacture. After the sections are assembled and the joints therebetween tested for leaks in the field, the joints may be successively insulated by the procedure just described. For this purpose the sleeve 18 is slipped over the first section of the pipe during the assembling of the line and may be slipped along the pipe from joint to joint as the joints are successively prepared for vulcanization. The elasticity and pliability of the sleeve, especially where it is made entirely of rubber, permit its passage over various types of pipe fittings, and its use over such fittings, no matter what conditions are encountered. For instance, in Fig. 2 the sleeve is shown as being used over an offset joint comprising a pair of elbows 24, 25, and a close nipple 26. Similarly, in Fig. 3, the sleeve is shown in use over a valve 27, and in Fig. 4, over a flange coupling 28, a union 29, and a short length of pipe 30.

It is also possible to insulate an entire line of conduit by progressively applying and vulcanizing the insulation, moving the sleeve along step by step to accomplish vulcanization.

As the sleeve 18 is relatively inexpensive, consisting preferably of a length of rubber tubing, it may be left on the conduit at the position where last used, or may be slit lengthwise and removed from the pipe.

Where the device is used in insulating underground conduits, earth or sand may be temporarily banked around the sleeve to give it additional support to withstand the pressure of the vulcanizing fluid.

We claim:

1. The method of applying insulation to a fluid-conducting conduit which comprises covering a section of the conduit with a layer of unvulcanized rubber composition, enclosing the covered section within a tubular sleeve, clamping the ends of the sleeve to the conduit beyond the unvulcanized covering, and vulcanizing the covering by circulating a vulcanizing fluid between the covering and the sleeve.

2. The method of applying insulation to a fluid-conducting conduit which comprises covering a section of the conduit with a layer of unvulcanized rubber composition, applying a rag wrapping to hold the rubber in place, enclosing the covered section within a tubular sleeve, clamping the ends of the sleeve to the conduit beyond the unvulcanized covering, and vulcanizing the covering by circulating a vulcanizing fluid between the covering and the sleeve.

3. The method of applying insulation to a fluid-conducting conduit which comprises covering the outer surfaces of the conduit sections except near their ends with vulcanized hard rubber, connecting the sections together, covering the uninsulated portions comprising the joint with unvulcanized hard rubber composition, applying an enveloping sleeve thereover, and vulcanizing the newly applied section of insulation by circulating a heating fluid through the space between the covering so applied and the sleeve.

4. The method of applying insulation to a fluid-conducting conduit which comprises progressively applying to the conduit sections of unvulcanized hard rubber material, surrounding the first section with a sleeve, vulcanizing the first section by circulating of heated fluid through the sleeve, and vulcanizing succeeding sections by moving the sleeve along the conduit to cover a section at a time and there circulating a heating fluid therethrough.

5. Apparatus for applying insulation to a fluid conduit, said apparatus comprising a tubular sleeve adapted to enclose a section of insulation applied to said conduit, means for sealing the ends of the sleeve to the surface of the conduit beyond the section to be vulcanized, and means for circulating a heating fluid between the sleeve and the applied insulation.

6. Apparatus for applying insulation to a fluid conduit, said apparatus comprising a tubular sleeve of vulcanized soft rubber adapted to enclose a section of insulation applied to said conduit, means for sealing the ends of the sleeve to the surface of the conduit beyond the section to be vulcanized, and means for circulating a heating fluid between the sleeve and the applied insulation.

7. Apparatus as defined by claim 6 in which the sleeve is reinforced by a layer of fabric.

8. Apparatus as defined by claim 6 in which the means for sealing comprises clamping means.

TRACY D. NATHAN.
ALLAN B. MERRILL.